(12) United States Patent
Leibl

(10) Patent No.: US 9,108,676 B2
(45) Date of Patent: Aug. 18, 2015

(54) SUBFRAME FOR A MOTOR VEHICLE

(75) Inventor: Peter Leibl, Manching (DE)

(73) Assignee: AUDI AG, Ingolstadt (DE)

(*) Notice: Subject to any disclaimer, the term of this patent is extended or adjusted under 35 U.S.C. 154(b) by 197 days.

(21) Appl. No.: 13/880,906

(22) PCT Filed: Sep. 24, 2011

(86) PCT No.: PCT/EP2011/004787
§ 371 (c)(1),
(2), (4) Date: Sep. 10, 2013

(87) PCT Pub. No.: WO2012/052103
PCT Pub. Date: Apr. 26, 2012

(65) Prior Publication Data
US 2014/0361581 A1 Dec. 11, 2014

(30) Foreign Application Priority Data
Oct. 23, 2010 (DE) .......................... 10 2010 049 344

(51) Int. Cl.
*B62D 29/00* (2006.01)
*B62D 21/11* (2006.01)

(52) U.S. Cl.
CPC .............. *B62D 29/002* (2013.01); *B62D 21/11* (2013.01)

(58) Field of Classification Search
CPC ...................................................... B62D 21/11
USPC .................................... 296/204; 280/124.109
See application file for complete search history.

(56) References Cited

U.S. PATENT DOCUMENTS

| 6,135,542 A | 10/2000 | Emmelmann et al. |
| 6,516,913 B1 | 2/2003 | Härtel et al. |
| 2005/0200093 A1* | 9/2005 | Komiya ................. 280/124.109 |
| 2006/0103099 A1 | 5/2006 | Zuber |
| 2006/0175786 A1 | 8/2006 | Streubel et al. |

FOREIGN PATENT DOCUMENTS

| AT | 334 221 | 1/1977 |
| CN | 1747851 | 2/2003 |
| DE | 39 32 121 | 4/1991 |
| DE | 197 20 640 | 10/1997 |
| DE | 100 06 388 | 8/2001 |
| DE | 100 57 566 | 5/2002 |
| DE | 101 58 627 | 6/2003 |
| DE | 102004031086 | 1/2006 |
| DE | 102005045297 | 4/2007 |
| DE | 102008049485 | 4/2010 |

(Continued)

OTHER PUBLICATIONS

International Search Report issued by the European Patent Office in International Application PCT/EP2011/004787 on Nov. 29, 2011.

(Continued)

*Primary Examiner* — H Gutman
(74) *Attorney, Agent, or Firm* — Henry M. Feiereisen LLC

(57) ABSTRACT

The invention relates to a subframe (10) for a motor vehicle, having a base frame which forms a cavity and which is connected to a vehicle body via a plurality of fastening points, wherein the base frame has at least one force-introduction point (20) for receiving and/or supporting further motor vehicle components. The invention is characterized in that the cavity is locally filled with rigid foam (24) in the vicinity of the force-introduction point (20).

4 Claims, 4 Drawing Sheets

(56) References Cited

FOREIGN PATENT DOCUMENTS

| | | |
|---|---|---|
| EP | 1 106 478 | 6/2001 |
| EP | 1 577 195 | 9/2005 |
| GB | 1 426 265 | 2/1976 |
| WO | WO 97/09134 | 3/1997 |

OTHER PUBLICATIONS

Chinese Search Report issued by the Chinese Patent Office in Chinese Application No. 201180051095.4.

* cited by examiner

US 9,108,676 B2

SUBFRAME FOR A MOTOR VEHICLE

CROSS-REFERENCES TO RELATED APPLICATIONS

This application is the U.S. National Stage of International Application No. PCT/EP2011/004787, filed Sep. 24, 2011, which designated the United States and has been published as International Publication No. WO 2012/052103 and which claims the priority of German Patent Application, Serial No. 10 2010 049 344.9, filed Oct. 23, 2006, pursuant to 35 U.S.C. 119(a)-(d).

BACKGROUND OF THE INVENTION

The invention relates to a subframe for a motor vehicle.

Such subframes, particularly in the form of a rear axle support, are complex chassis structures that incur high investments. To keep investments as low as possible, one design of an axle support per model series is therefore normally used. This design is then dimensioned to ensure sufficient operational stability for the heaviest vehicle of this model series. Conversely, this means that the axle support used in this model series is dimensioned too heavy for lighter vehicles, e.g. less motorized vehicles, and thus represents an unnecessarily high component weight.

SUMMARY OF THE INVENTION

The invention is based on the object to improve a subframe for a motor vehicle to obviate the stated drawbacks and to enable use within a model series without unnecessary structural weight for the base variant I for light vehicles.

This object is attained by an auxiliary frame for a motor vehicle, including a base frame forming a cavity and connected via several fastening points with a vehicle body, wherein the base frame has at least one force-introduction point for receiving and/or supporting further vehicle components, wherein the cavity is filled locally with rigid foam in the vicinity of the force-introduction point.

The sub-claims set forth advantageous refinements of the invention.

In a known manner, the sub-frame for a motor vehicle has a base frame forming a cavity and connected with a vehicle body via a plurality of fastening points. Moreover, the base frame has at least one force-introduction point for receiving and/or support of further motor vehicle components. According to the invention, the cavity is filled locally with rigid foam in the vicinity of the force-introduction point.

The configuration of the subframe in accordance with the present invention allows now for the first time in an advantageous manner a dimensioning of the subframe on the basis of the lightest motor vehicle of a motor vehicle model series. That means the subframe according to the invention is substantially lighter in comparison to the prior art. For heavy vehicles of the model series, the cavity is filled with rigid foam in the vicinity of the force-introduction point. The reinforcement of the cavity with rigid foam provides sufficient stabilization of the base frame so as to ensure sufficient strength also for heavier vehicles of the model series. Foaming of the cavity with rigid foam has the added benefit of also improving the acoustic properties of the subframe.

Preferably, the rigid foam is polyurethane foam. The use of polyurethane foam is advantageous because it is inexpensive and, moreover, is easy to process.

It is of particular advantage that the reinforcement of the base frame in accordance with the invention can be carried out for differently configured force-introduction points.

According to a first embodiment, the force-introduction point includes a sleeve-shaped member which is arranged in the cavity of the base frame and firmly connected therewith, for example by a welded joint. As a result of the local foaming of the cavity, the sleeve-shaped member located in the base frame is fully encased in rigid foam.

According to a second embodiment, the force-introduction point includes a tab-shaped member disposed externally on the base frame and firmly connected thereto. The fixed connection between tab-shaped member and the outside of the base frame can in turn be realized for example by a welded joint. The base frame or the cavity of the base frame is foamed locally with rigid foam in the region of the tab-shaped member.

According to a further advantage of the subframe according to the invention, the subframe may be configured as a shell frame as well as a "conventional frame", i.e. a subframe with two longitudinal beams and at least one crossbeam. The reinforcement of the auxiliary frame with rigid foam in accordance with the invention is possible in both embodiments in a simple manner.

BRIEF DESCRIPTION OF THE DRAWING

Further advantages, features and possible applications of the present invention will become apparent from the following description in conjunction with the exemplary embodiments shown in the drawing.

The description, claims and drawings uses the terms as used in the list of reference signs further below and associated reference numerals. It is shown in the drawing:

DETAILED DESCRIPTION OF PREFERRED EMBODIMENTS

Figure 1:
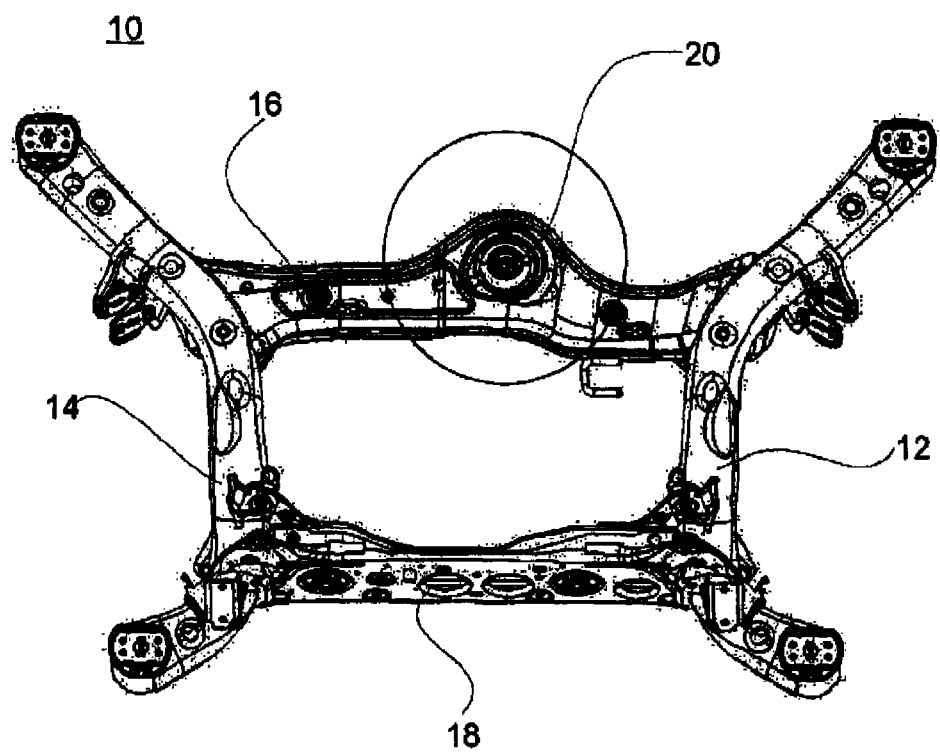
FIG. 1 a plan view of a subframe.

FIG. 1 shows more or less schematically a subframe generally designated by reference numeral 10 and configured in the form of a rear axle support for a motor vehicle of a motor vehicle model series.

The subframe 10 includes two longitudinal beams 12, 14 aligned in the vehicle longitudinal direction, and two crossbeams 16, 18 are aligned in the vehicle transverse direction. In addition, the subframe 10 has several force-introduction points 20 for receiving and/or supporting additional motor vehicle components. In the following, the description focuses in greater detail on the force-introduction point 20 arranged on the crossbeam 16.

Figure 2:
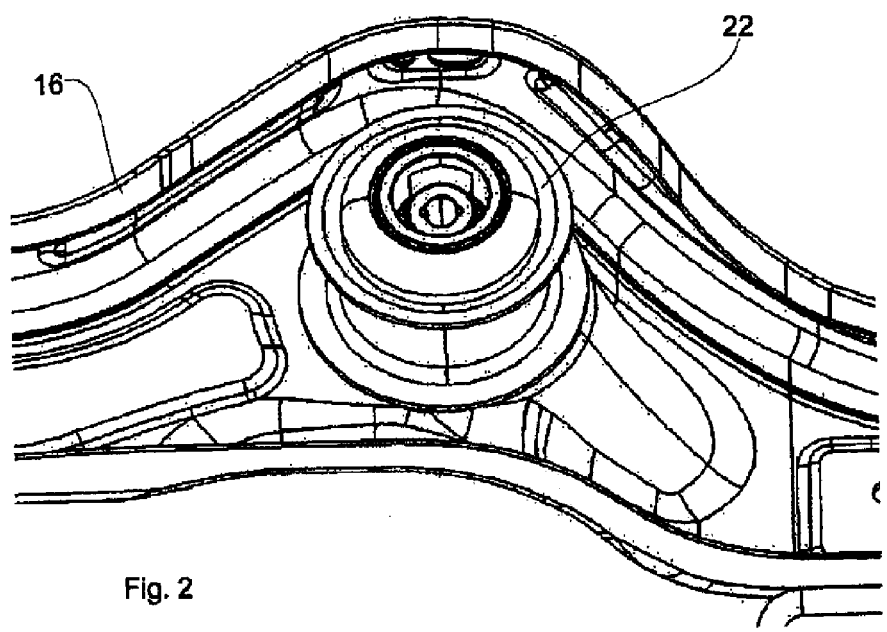
FIG. 2 a detailed view of the section of the subframe of FIG. 1 as marked by the circle, with the cover shell being hidden and the force-introduction point being provided without foaming.

As can be seen from FIG. 2, the first crossbeam 16 having the mounting 20 is formed as a hollow body. The cover shell of the crossbeam 16 is not shown here. The force-introduction point 20 includes a sleeve-shaped member 22, which is firmly connected to the crossbeam 16, for example via a welded joint. As dimensioning of the subframe 10 in accordance with the invention is oriented in relation to the lower limit of the technically admissible rear axle load, the subframe 10 is very light in weight and represents a very lightweight basic variant for the involved motor vehicle model series.

Figure 3:
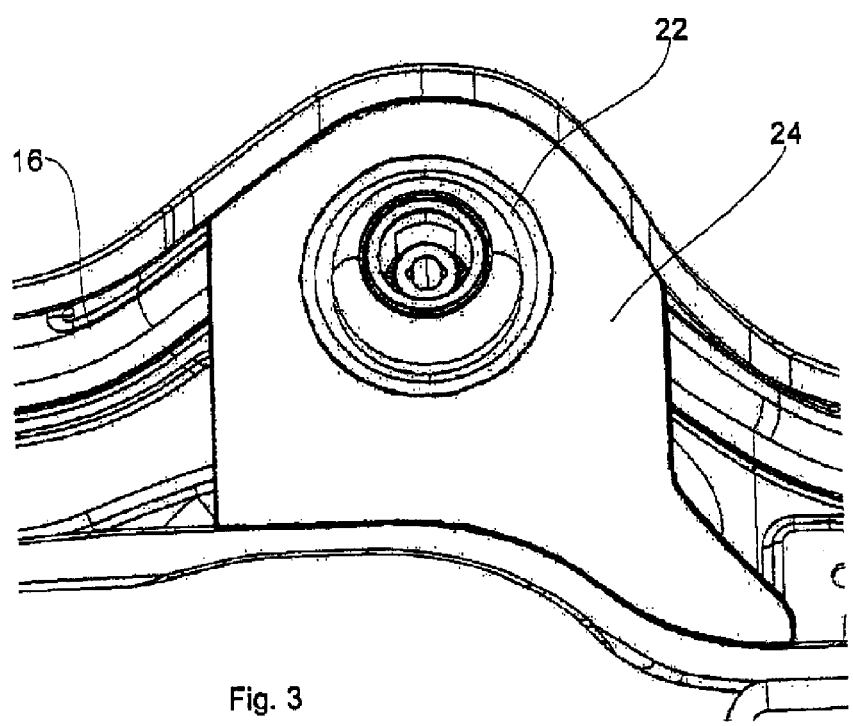
FIG. 3 a detailed view of FIG. 2, with the force-introduction point being provided with a foaming.

To permit use of the subframe 10 also for heavy vehicles, the cavity—as shown in FIG. 3—is foamed with rigid foam 24 about the force-introduction point 20, i.e. the sleeve-shaped member 22. The rigid foam 24 in the cavity provides stability of the base structure, prevents relative movements in the cavity, and thus contributes to the increase in service life when slight wall thicknesses of structures are involved. In addition to the increase in service life, the reinforcement using rigid foam 24 also improves acoustic properties.

The rigid foam 24 involves here polyurethane foam.

Figure 4:
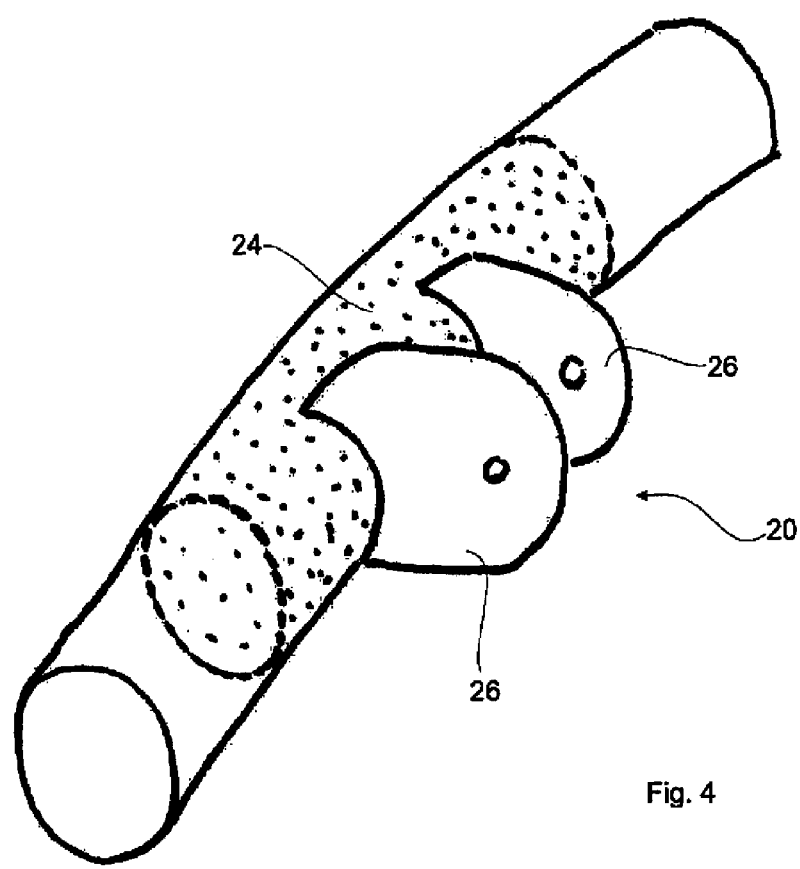
FIG. 4 is a schematic illustration of a further embodiment of a force-introduction point.

FIG. 4 shows schematically a section of a subframe 10 with a force-introduction point 20. According to this embodiment, the force-introduction point 20 includes a tab-shaped member 26. The tab-shaped member 26 is firmly connected to the outer contour of the subframe, e.g. by a welded joint. In order to ensure stabilization of the subframe 10, the interior of the subframe 10 is foamed locally with rigid foam 24 in the region of the tab-shaped member 26.

The invention claimed is:

1. An auxiliary frame for a motor vehicle, comprising:
a base frame forming a cavity inside it and connected to a vehicle body;
a sleeve-shaped member arranged inside the base frame in the cavity of the base frame in an area of a force introduction point and firmly connected to the base frame for receiving or supporting a vehicle component; and
rigid foam filling the cavity inside the base frame and outside the sleeve-shaped member in a space between the base frame and the sleeve-shaped member to fully surround the sleeve-shaped member from outside inside the base frame and to encase the sleeve-shaped member.

2. The auxiliary frame of claim 1, wherein the rigid foam is a polyurethane foam.

3. The auxiliary frame of claim 1, wherein the base frame is formed as a shell frame.

4. The auxiliary from of claim 1, wherein the base frame includes two longitudinal beams and at least one cross beam connected to the longitudinal beams.

* * * * *